(12) United States Patent
Lee

(10) Patent No.: US 6,634,629 B1
(45) Date of Patent: Oct. 21, 2003

(54) HYDRAULIC ENGINE MOUNTING

(75) Inventor: Wu-Kwang Lee, Kwangmyung-shi (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 10/269,517

(22) Filed: Oct. 11, 2002

(30) Foreign Application Priority Data

Jun. 3, 2002 (KR) ......................................... 2002-31082

(51) Int. Cl.[7] .................................................. F16F 5/00
(52) U.S. Cl. .................................................. 267/140.13
(58) Field of Search ....................... 267/140.11, 140.13, 267/141.1

(56) References Cited

U.S. PATENT DOCUMENTS 6,244,578 B1 * 6/2001 Schwerdt ............... 267/140.13
6,349,918 B1 * 2/2002 Bunker ........................ 248/635
2002/0158388 A1 * 10/2002 Itoh et al. .............. 267/140.11

* cited by examiner

Primary Examiner—Chris Schwartz
(74) Attorney, Agent, or Firm—Pennie & Edmonds LLP

(57) ABSTRACT

Disclosed is a hydraulic engine mounting capable of supporting an engine mounted on a vehicle body so as to prevent mechanical interference of the engine with the vehicle body, and prevent transmission of engine vibrations and noises to the vehicle body. The hydraulic mounting comprises an upper plate coupled to one vibration source; a lower plate coupled to a supporting portion supporting the other vibration source; a body fixed to an upper portion of the lower plate, and having an air chamber therein which is communicated with an exterior through a plurality of orifices; a variable diaphragm covering an opened upper surface of the body; an elastic member fixed to a lower portion of the upper plate, and defining a liquid chamber together with the variable diaphragm; and a partition for dividing the liquid chamber into an upper liquid chamber and a lower liquid chamber which communicate with each other.

6 Claims, 1 Drawing Sheet

HYDRAULIC ENGINE MOUNTING

FIELD OF THE INVENTION

The present invention relates to a hydraulic engine mounting capable of supporting an engine mounted on a vehicle body so as to prevent mechanical interference of the engine with the vehicle body, and prevent transmission of engine vibrations and noises to the vehicle body.

BACKGROUND OF THE INVENTION

In motor vehicles, most vibration and noise is generated from the engine, and thus are transmitted through a vehicle body to the entire vehicle. Accordingly, it is necessary to minimize the transmission of the vibrations and noises generated from the engine to the vehicle so as to reduce the vibration and noise of the vehicle.

Conventionally, engine mounts are provided with vibration-proof rubber to attenuate the vibration and noise of the engine using the elasticity of the vibration-proof rubber. Recently, a hydraulic mount containing a fluid therein has been developed. In a conventional hydraulic mount a fluid chamber is divided into an upper fluid chamber and a lower fluid chamber by a partition plate. Typically the partition plate is provided with an annular orifice path for fluid communication between the chambers. Also, a plurality of holes are typically formed in a center portion of the partition plate. The holes may be referred to as a decoupler.

When the vehicle travels at a constant speed with engine revolutions in a range of about 1,000 rpm to about 3,500 rpm, the vibration of the engine is in the range of ±0.5 to ±0.1 mm. This vibration causes the volume of the upper fluid chamber in the conventional hydraulic mount to be changed. The fluid is moved between the upper and lower fluid chambers through the decoupler. The vibration of the engine is thus converted into kinetic energy of the fluid, thereby attenuating the vibration of the engine.

Upon starting or stopping the engine, the vibrating range of the engine is within about ±1.0 mm, and at that time, the fluid flows between the upper and lower fluid chambers though not the decoupler but orifice member to attenuate the vibration of the engine. The conventional hydraulic mounting controls the dynamic characteristics through the flow of the fluid, thereby improving performance of reducing the vibrations relative to the engine mounting consisting of the vibration-proof rubber.

However, although the conventional hydraulic engine mount has the superior vibration reducing performance in comparison with the conventional engine mounting consisting of the vibration-proof rubber, it is still limited to the vibration attenuating performance at a low frequency vibration range and a high frequency minute vibration range.

Specifically, since the effect of attenuating the vibration is low at a low frequency range of about 10 to 50 Hz, the shock is easily generated by the vibration upon key on or off. Since it does not control the dynamic characteristic in the high frequency minute vibration range of which a revolution of the engine falls in a range of 3,500 rpm to 6,000 rpm, the vibration frequency falls in the range of 100 to 350 Hz, and an amplitude of the vibration is about ±0.05 mm, there is a drawback in that a booming noise can be generated.

Japanese Patent Laid-Open Publication No. Hei 10-19712 discloses an apparatus having a movable partition plate made of rubber, which is deformable by negative pressure of the engine. The movable partition plate is deformed in correspondence with the vibration frequency of the vehicle body detected by a vibration sensor, thereby varying the volume of a fluid chamber and thus attenuating the vibration in accordance with various frequency bands. However, since the apparatus has a vibration sensor for detecting the vibration of the vehicle body and means of negative pressure for deforming the movable partition plate, there is a drawback of complicated and expensive construction.

SUMMARY OF THE INVENTION

Accordingly, the present invention is directed to a hydraulic engine mount that substantially obviates one or more problems due to limitations and disadvantages of the related art.

In a preferred embodiment of the present invention, an upper plate is coupled to one vibration source. A lower plate is coupled to a supporting portion, supporting the other vibration source. A body is fixed to an upper portion of the lower plate. The body has an air chamber therein that communicates with the exterior through a plurality of orifices. A variable diaphragm covers an open upper surface of the body. An elastic member is fixed to a lower portion of the upper plate and defines a liquid chamber together with the variable diaphragm. A partition divides the liquid chamber into an upper liquid chamber and a lower liquid chamber which communicate with each other.

Preferably, the diaphragm has a double construction, with a center portion circularly and upwardly extending to contact a bottom of the partition and thus support the partition. The orifices of the air chamber may be arranged at a desired interval along an outer circumference of the body. Preferably, the body is made of polyurethane.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a farther understanding of the present invention and are incorporated in and constitute a part of this application, illustrate embodiment(s) of the present invention and together with the description serve to explain the principle of the present invention. In the drawings.

DETAILED DESCRIPTION OF THE PREFERRED EMBODIMENTS

Figure 1:
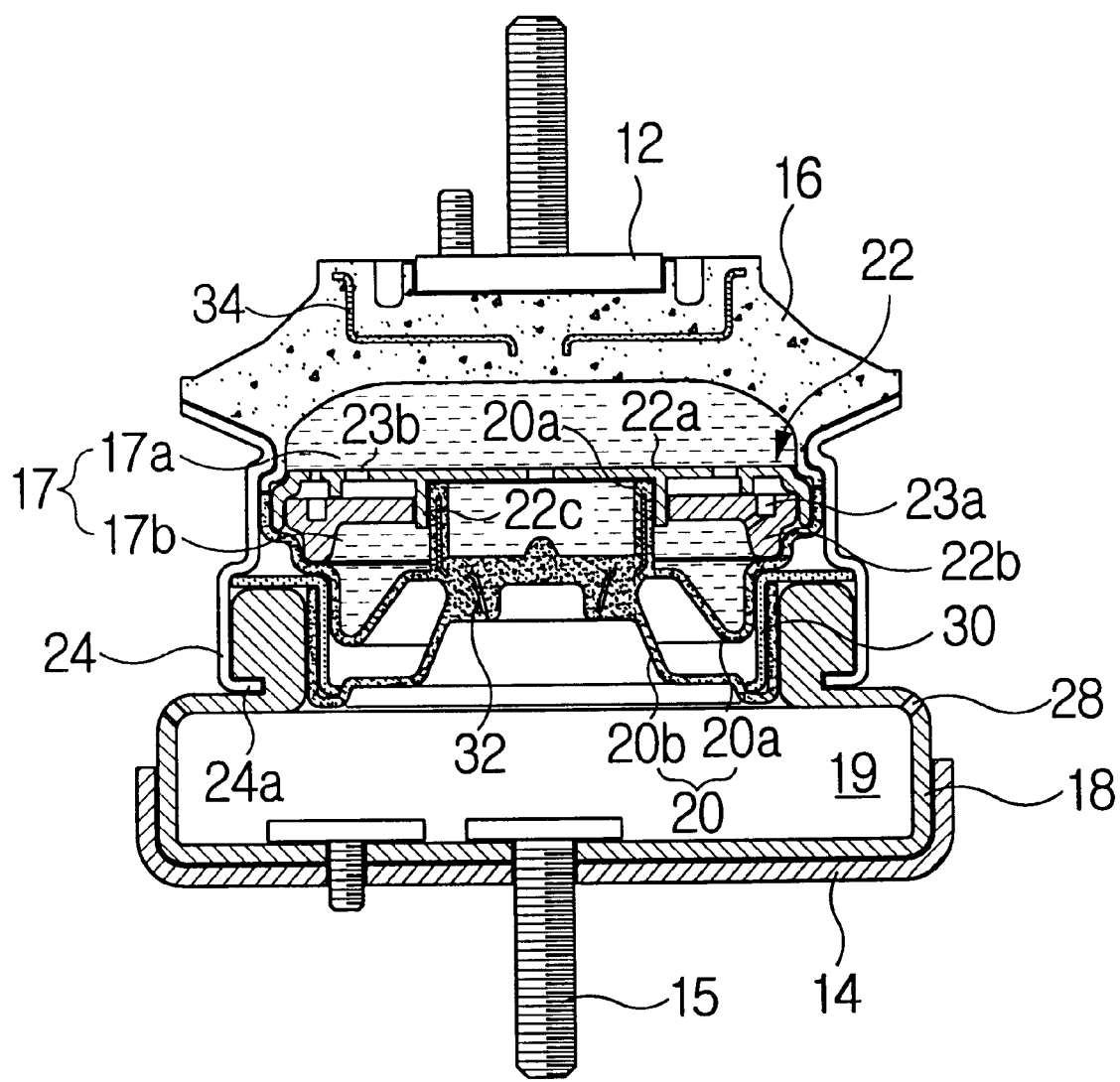
FIG. 1 is a cross sectional view of a hydraulic mounting according to a preferred embodiment of the present invention.

Reference will now be made in detail to a preferred embodiment of the present invention.

As shown in FIG. 1, a hydraulic mount according to a preferred embodiment of the present invention includes upper and lower plates 12 and 14, an elastic member 16, a body 18, a variable diaphragm 20, a partition 22, and a housing 24. The upper plate 12 is coupled to one vibration source, i.e., an engine, while the lower plate 14 is coupled to a supporting portion supporting the other vibration source. i.e., a vehicle body. The elastic member 16 is fixed to a lower portion of the upper plate 12, and the body 18 is fixed to an upper portion of the lower plate. A liquid chamber 17 is provided between the elastic member 16 and the body 18. A metal housing 24 is installed around outer circumferences of the elastic member 16 and the body 18 to support the elastic member 16 and the body 18.

The body 18 includes an air chamber 19 therein, and the air chamber 19 is divided from the liquid chamber 17 by the variable diaphragm 20 installed on an upper surface of the body 18. The liquid chamber 17 is divided into an upper liquid chamber 17a and a lower liquid chamber 17b by the partition 22.

Preferably, the body 18 is made of polyurethane, the polyurethane having an advantage of good durability and dynamic characteristic relative to a common rubber. A person skilled in the art may select other suitable materials. The body is not directly attached to the lower plate 14 and the housing 24, which are made of metal. A protrusion 24a is formed on a lower end of the housing 24, as shown in FIG. 1, to fix the body to the housing 24. The body is also fixed to the lower plate 14 by means of a bolt 15 for fastening the vehicle body. The air chamber 19 of the body 18 communicates with the exterior through a plurality of orifices 28 formed at a desired interval along an outer circumference of the body 18. The air flows into or out of the air chamber though the orifices.

The variable diaphragm 20, dividing the liquid chamber 17 and the air chamber 19, is made of elastic body such as rubber. Preferably, the diaphragm has a double construction of upper and lower diaphragm members 20a and 20b, as shown in FIG. 1. A space formed between the upper and lower diaphragm members 20a and 20b is filled with air. An edge of the variable diaphragm 20 is supported by a lower reinforcing member 30 installed around an inner circumference of an upper end of the body 18 and the partition 22.

The partition 22 has a double construction of an upper partition 22a and a lower partition 22b, and preferably, is made of aluminum by molding. Preferably, a circular fixing portion 22c extends downward from a bottom of the partition 22, and a circular supporting portion 20a extends upward from a center portion of the variable diaphragm 20 to be inserted into the fixing portion 22c of the partition 22. More preferably, a metal reinforcing member 32 is installed in the supporting portion 20a.

An annular orifice passage 23a is formed in an edge of the partition 22. The upper fluid chamber 17a and the lower fluid chamber 17b communicate with each other through the orifice passage 23a at a circumferentially opposed location. A plurality of decouplers 23b penetrate vertically the upper and lower partitions to communicate the upper and lower fluid chambers 17a and 17b. An upper reinforcing member 34 is inserted in the elastic member 16.

When vibration is transferred from the engine to the hydraulic mount of the present invention, the vibration generated from the engine is primarily attenuated by the elastic member 16 fixed to the upper plate 12. If the volume of the upper liquid chamber 17a is varied by the vibration of the elastic member 16, the liquid in the liquid chamber 17 flows between the upper and lower liquid chambers 17a and 17b through the orifice passages 23a or the decoupler 23b of the partition 22, so that the vibration of the engine is converted to the kinetic energy of the liquid, thereby attenuating the vibration of the engine. Next, the volume of the lower liquid chamber 17b is changed by the liquid flow between the upper and lower liquid chambers 17a and 17b, so that the volume of the air chamber 19 is changed through the deformation of the variable diaphragm 20. Accordingly, the air flows in or out of the air chamber 19 through the orifices 28 of the body 18, thereby more attenuating the vibration energy of the engine.

With the construction as described above, the hydraulic mounting of the present invention attenuates doubly the vibration of the engine by use of two kinds of fluids, i.e., liquid and air, and has an advantage of controlling the dynamic characteristic in all frequency ranges from a low frequency range upon key on or off to a high frequency minute vibration range of which a revolution of the engine falls in a range of 3,500 rpm to 6,000 rpm.

The forgoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A hydraulic mount, comprising:
    an upper plate adapted to be coupled to one vibration source;
    a lower plate coupled to a supporting portion adapted to support another vibration source;
    a body fixed to the lower plate, and having an air chamber therein which communicates with surrounding air through a plurality of orifices;
    a variable diaphragm covering an opened upper surface of the body wherein said diaphragm has a double construction of upper and lower diaphragm members which are spaced apart from each other with an air filled space therebetween;
    an elastic member fixed to the upper plate, and defining a liquid chamber together with the variable diaphragm; and
    a partition for dividing the liquid chamber into an upper liquid chamber and a lower liquid chamber which communicate with each other.

2. The hydraulic mount as claimed in claim 1, wherein a center portion of the variable diaphragm extends upward to contact a bottom of the partition and thus support the partition.

3. The hydraulic mounting as claimed in claim 1, wherein the orifices of the air chamber are spaced along the outer circumference of the body.

4. The hydraulic mounting as claimed in claim 1, wherein the body is made of polyurethane.

5. A hydraulic mount, comprising:
    an upper plate adapted to be coupled with a vibration source;
    a lower plate adapted to be coupled with a further vibration source;
    a body coupled to said lower plate having an open upper portion;
    a variable diaphragm enclosing the opened upper portion of said body thereby defining an air chamber configured for communication with atmospheric air through at least one opening wherein said variable diaphragm comprises:
        an upper diaphragm member; and
        a lower diaphragm member, wherein said upper diaphragm member and said lower diaphragm member couple together to form a non-atmospherically communicating space;
    an elastic member coupled on an upper surface with said upper plate and on a lower surface with said variable diaphragm thereby defining a liquid chamber; and
    a partition defining openings coupled between said elastic member and said variable diaphragm within said liquid chamber thereby dividing said liquid chamber into an upper liquid chamber and a lower liquid chamber in fluid communication.

6. A hydraulic mount, comprising:

an upper plate adapted to be coupled to one vibration source;

a lower plate coupled to a supporting portion adapted to support another vibration source;

a body fixed to the lower plate, and having an air chamber therein which communicates with surrounding air through a plurality of orifices spaced along the outer circumference of the body;

a variable diaphragm covering an opened upper surface of the body wherein said diaphragm has a double construction of upper and lower diaphragm members which are spaced apart from each other and wherein air fills a space therebetween;

an elastic member fixed to the upper plate, and defining a liquid chamber together with the variable diaphragm; and a partition for dividing the liquid chamber into an upper liquid chamber and a lower liquid chamber which communicate with each other;

wherein a center portion of said variable diaphragm extends upward to contact a bottom of said partition and thus support said partition.

* * * * *